W. WIMPFHEIMER.
MOTOR VEHICLE FENDER.
APPLICATION FILED DEC. 6, 1913.
1,146,830.
Patented July 20, 1915.
2 SHEETS—SHEET 1.
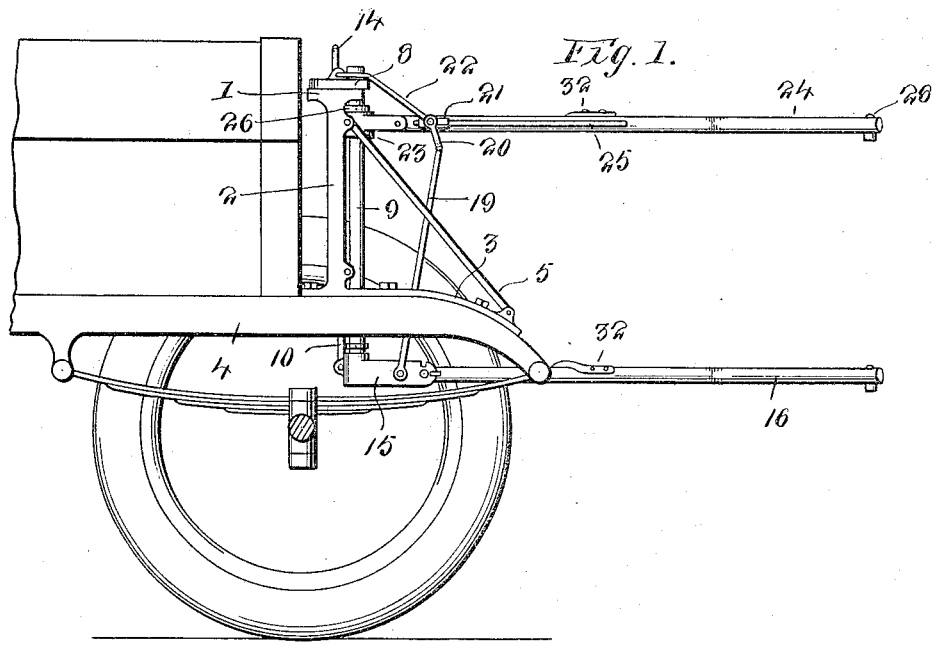
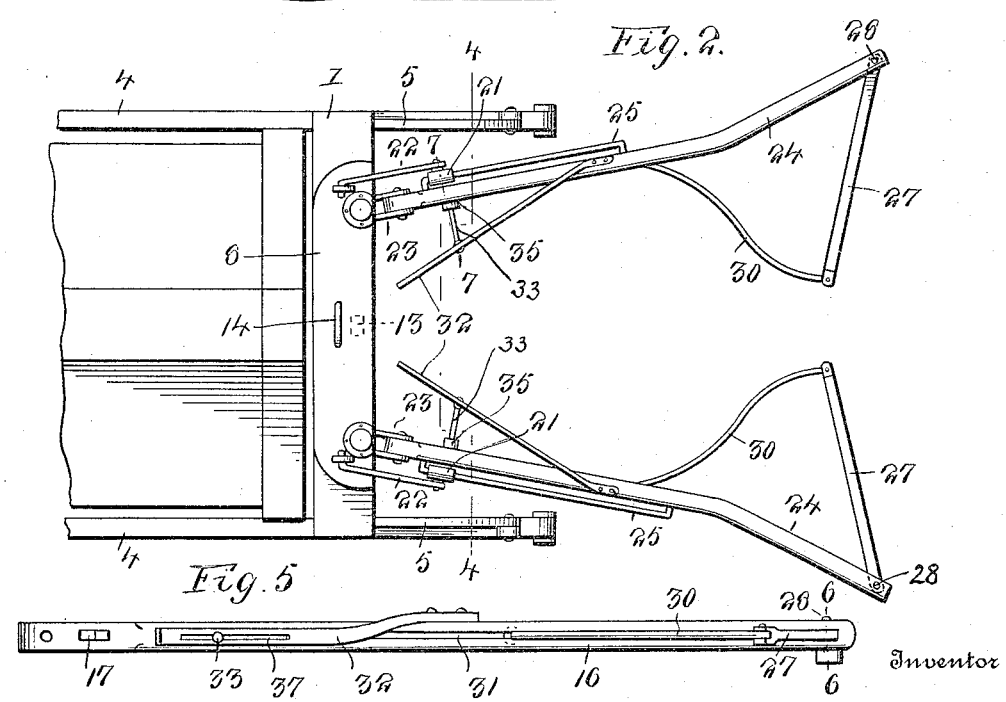
Witnesses
E. R. Ruppert.
V. B. Hillyard.
Inventor
William Wimpfheimer.
By Victor J. Evans
Attorney

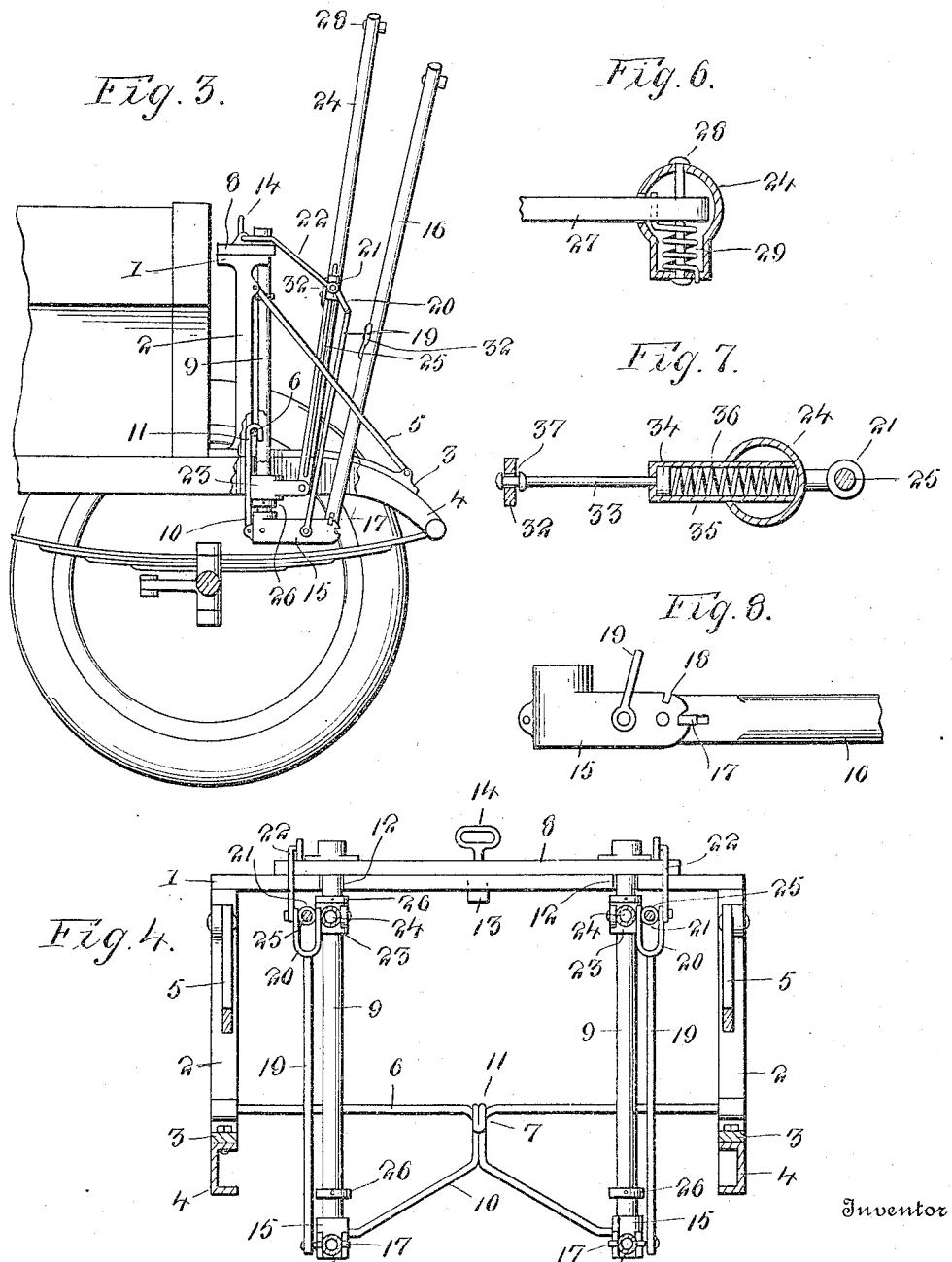

UNITED STATES PATENT OFFICE.

WILLIAM WIMPFHEIMER, OF GRANBY, CONNECTICUT.

MOTOR-VEHICLE FENDER.

1,146,830.   Specification of Letters Patent.   Patented July 20, 1915.

Application filed December 6, 1913.  Serial No. 805,105.

*To all whom it may concern:*

Be it known that I, WILLIAM WIMPFHEIMER, a citizen of the United States, residing at Granby, in the county of Hartford and State of Connecticut, have invented new and useful Improvements in Motor-Vehicle Fenders, of which the following is a specification.

The primary purpose of the invention is the provision of a safety appliance for mechanically propelled vehicles of every variety, whereby injury to persons in the path of the vehicle is prevented in the event of a collision.

While the invention provides a safety device in the nature of a fender specially adapted for automobiles, motor trucks and the like it is to be understood that such a safety device may be equally well adapted for mechanically propelled cars and kindred conveyances so as to prevent serious mishap to a person when struck.

The invention provides a safety appliance embodying opposed arms which flare at their forward ends so as to gather in a person in the path of the vehicle and struck thereby, such arms being provided at or near their front ends with closing devices to extend across the space formed between the arms, whereby the person received between such arms is prevented from being thrown forward by a rebound or from other cause. Retaining devices are also arranged to coöperate with the inner ends of the arms to assist materially in holding the person in upright position, and to prevent in a great measure the forward movement of such person after being received between the arms as a result of impact with the vehicle.

The invention further provides means to reduce the impact of the person with the machine to the smallest amount possible, thereby lessening the chances for injury or other ill effect due to the collision.

The device further embodies upper and lower sets of arms and concomitant parts, the several elements being constructed and arranged to admit of the safety appliance or the fender as a whole being readily placed in position or quickly removed, as also to be folded into a small space for convenience of handling and storing.

The invention consists of the novel features, details of construction and combination of parts, which hereinafter will be more particularly set forth, illustrated in the accompanying drawings, and subsequently claimed.

Referring to the drawings, forming a part of the specification, Figure 1 is a side view of the front portion of an automobile provided with a safety appliance embodying the invention. Fig. 2 is a top plan view. Fig. 3 is a side view showing the arms folded. Fig. 4 is a vertical transverse section on the line 4—4 of Fig. 2, omitting the parts comprising the buffer. Fig. 5 is an enlarged view of one of the arms as seen from the inner side. Fig. 6 is a section on the line 6—6 of Fig. 5 showing the parts on a larger scale. Fig. 7 is an enlarged section on the line 7—7 of Fig. 2. Fig. 8 is a detail view of the joint between the lower arm and the supporting frame showing the parts on a larger scale.

Corresponding and like parts are referred to in the following description, and indicated in all of the views of the drawings, by the same reference characters.

The safety appliance embodies a frame which is approximately of U-form and comprises a cross piece 1 and vertical members 2, the latter being provided at their lower ends with extensions 3 which rest upon and are bolted or otherwise secured to the front ends of the side bars 4 of the machine. Braces 5 connect the upper ends of the vertical members 2 and the front ends of the extensions 3. The frame is preferably located in front of the radiator and serves in a measure as a protector therefor in conjunction with the remaining parts of the device. A transverse rod 6 connects the lower ends of the vertical members 2 and has a crimp 7 at a middle point. The frame just described constitutes a main support for a supplemental frame to which the operating parts of the fender are attached, the main frame being permanently secured to the machine whereas the supplemental frame is detachable, thereby admitting of the fender proper being removed and laid aside when not required for use. The supplemental frame is likewise of substantially U-form and comprises a horizontal member 8 and vertical members 9, such parts being connected in any manner. A transverse rod 10 connects the lower ends of the vertical members 9 and its middle portion is upwardly deflected and terminates in a hook 11 which is adapted to engage the crimp portion 7 of the rod 6. The cross piece 1 of the main frame is formed in its front edge with notches 12 which are adapted to receive the upper ends of the vertical members 9. A lug 13 provided upon the horizontal member 8 is adapted to enter an opening in the cross piece 1, thereby serving to fix the position of the supplemental frame when fitted to the main frame. A handle 14 located centrally of the horizontal member 8 provides convenient means for lifting and carrying the supplemental frame when removed from the machine. The member 8 of the supplemental frame rests upon the cross piece 1 of the main frame. Forward extensions 15 are provided at the lower ends of the vertical members 9. Arms 16 are pivotally connected at their inner ends to the extensions 15 and are provided with catches 17 to engage notches in the edges of the extensions 15 so as to hold such arms either in an upright, or horizontal position, as indicated most clearly in Figs. 3 and 1. A rod 19 is connected at its lower end to each of the extensions 15 and its upper end has a fork 20 to which a guide sleeve 21 is pivotally connected, a brace 22 connecting such fork 20 and guide sleeve with a lug formed upon the horizontal member 8 of the supplemental frame. A runner 23 is mounted upon each vertical member 9 and is free to move thereon and consists of a sleeve having a forward extension. An arm 24 is pivoted at its inner end to the extension of the sleeve forming part of the runner 23 and said arm has a guide rod 25 at one side extending parallel therewith from some distance, said guide rod passing through the guide sleeve 21. As the runner 23 moves upward upon the vertical member 9 the arm 24 turns from an upright into a horizontal position and the guide rod 25 slides in the sleeve 21 and the latter turns about its pivotal connection with the fork 20 and brace 22. Stops 26 are secured to the vertical member 9 near its upper and lower ends and limit the sliding movements of the runner 23 as indicated most clearly in Figs. 3 and 4. Each of the arms 24 and 16 are of similar or like formation although differently mounted. When the arms 24 and 16 are in horizontal position they are located one above the other as indicated most clearly in Fig. 1. When such arms are turned into approximately horizontal position they come close together as indicated in Fig. 3. As clearly indicated the upper and lower arms are provided in pairs and are spaced apart with their front ends forwardly flared so as to gather in a person who may happen to be in the path of the advancing machine or vehicle. The lower arms are designed chiefly for picking up children, whereas the upper arms are provided for adults, the purpose being to catch the persons and hold them in upright position.

Each arm of the sets of arms is provided with a retainer, the same consisting of a rod or bar 27 which is pivoted at its outer end to the front end of the arm as indicated at 28. A coiled spring 29 mounted upon the pivotal fastening 28 has one end in engagement with the arm and its opposite end in engagement with the retainer, said spring normally holding the retainer in operative position that is extended across the space formed between the arm as indicated most clearly in Fig. 2. Braces 30 are pivotally connected at their front ends to the rods or bars 27 and have their rear ends slidingly connected with the arms. Such connection may be effected in any manner it being preferred to have a block or like slide at the inner end of each brace 20 and mounted to slide in the arm which for this purpose is preferably made tubular, a longitudinal slot 31 being formed in a side of the arm for the inner end of the brace 30 to travel in.

Buffers are located near the inner ends of the arms and are designed to break the impact of a person when struck and passing between such arms, thereby preventing serious injury to the person likely to result from coming in contact with the vehicle or machine. The buffer for each pair of arms comprises complemental rods or bars 32 each of such rods being attached at its front end to one of the arms and inclining inwardly and rearwardly. The rods or bars 32 are outwardly yieldable at their rear ends and in the preferable construction such rods or bars possess a spring action. As indicated most clearly in Fig. 3 the rods or bars 32 are rearwardly convergent and as a result a person passing between the arms has the rearward movement retarded by the action of the rods or bars 32 pressing on the rods 33, each rod having its outer end provided with a piston 34 which is arranged to operate in a barrel 35 connected to the main arm, a spring 36 being arranged in such barrel and normally exerting an outward pressure upon the piston thereby supplementing the spring action of the rod or bar 32. When the rear end of the rod or bar 32 is pressed outward the piston 34 is caused to move in the barrel 35 and compress the spring 36. A longitudinal slot 37 is formed in the rear end of each of the rods or bars 32 to make provision for relative play between the parts 32 and 33 to prevent binding between them.

In assembling the parts the main frame is bolted or otherwise secured to the side bars 2 of the vehicle or machine. The supplemental frame is placed in position by introducing the lug 13 in the opening of the cross piece 1 of the main frame after the vertical members 9 have been received in the notches 12. When the supplemental frame is in position the hook 11 engaging the rod 6 retains the supplemental frame in proper position. When the fender is in operative position the arms 24 and 16 project horizontally. When the fender is temporarily out of use the arms 24 and 16 are folded in upright position as indicated in Fig. 3. When it is required to remove the fender from the vehicle or machine the supplemental frame with the parts attached thereto may be easily disconnected from the main frame and set aside. When a person is struck by the fender the retainers move rearward in an arc of a circle to admit of the person passing between the arms and after such retainers have been cleared they regain their normal positions through the action of the spring 29 to prevent the person being thrown forward by a rebounding action or from another cause. The movement of the person between the arms is retarded by the buffer elements 32 in the manner stated. It will thus be understood that the person is practically held in an upright position and is prevented from experiencing injurious contact with the vehicle or machine by means of the buffers or from being thrown forward by the action of the retainers.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claims appended hereto.

Having thus described the invention what is claimed as new is:—

1. A safety appliance for vehicles comprising a pair of spaced arms, retainers for closing the space formed between the arms, spring means for holding the retainers in closed position, and braces having pivotal connection with the retainers and sliding connection with the arms.

2. A safety appliance for vehicles comprising a pair of spaced hollow arms having slots in their sides, retainers having pivotal connection with the arms and normally closing a space formed between them, blocks slidably mounted in the arms, braces connecting the sliding blocks with the retainers, and springs normally exerting a yielding pressure to hold the retainers in closed position.

3. A safety appliance comprising a frame, uprights having connections with the frame, slides mounted upon the uprights, and arms pivotally connected to the slides and adapted to receive between them the person struck as the result of a collision.

4. In a fender for vehicles, the combination of vertical members, slides mounted to move on such vertical members, arms pivotally connected at their rear ends to the slides and pivotally mounted guides engaging and supporting the arms intermediate of their ends.

5. In a fender, the combination of vertical members, slides mounted to move on such members, guide sleeves having pivot connection with the vertical members, arms pivoted at their rear ends to the slides and guide rods carried by the arms and engaging the said guide sleeves.

6. In a fender, the combination of a main frame, a supplemental frame removably connected to the main frame, arms pivotally connected with the supplemental frame and adapted to be turned into upright or horizontal position, and brace connections between such arms and the supplemental frame.

In testimony whereof I affix my signature in presence of two witnesses.

WILLIAM WIMPFHEIMER.

Witnesses:
CHRISTIAN WIMPFHEIMER,
EDWIN H. SHATTUCK.

Copies of this patent may be obtained for five cents each, by addressing the "Commissioner of Patents, Washington, D. C."